(12) United States Patent
Seo

(10) Patent No.: US 7,814,249 B2
(45) Date of Patent: Oct. 12, 2010

(54) APPARATUS TO RECOGNIZE MEMORY DEVICES

(75) Inventor: In-chang Seo, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 833 days.

(21) Appl. No.: 11/646,445

(22) Filed: Dec. 28, 2006

(65) Prior Publication Data

US 2007/0162671 A1  Jul. 12, 2007

(30) Foreign Application Priority Data

Jan. 12, 2006  (KR) .................... 10-2006-0003494

(51) Int. Cl.
*G06F 13/00* (2006.01)
*H04L 12/40* (2006.01)

(52) U.S. Cl. .................. 710/110; 710/107; 710/300; 370/438

(58) Field of Classification Search ................ 710/110, 710/107, 300; 370/438; 395/311
See application file for complete search history.

(56) References Cited

U.S. PATENT DOCUMENTS

| | | | | |
|---|---|---|---|---|
| 5,892,933 A | * | 4/1999 | Voltz | 710/316 |
| 6,351,618 B1 | * | 2/2002 | Pollocks, Jr. | 399/12 |
| 6,728,811 B2 | * | 4/2004 | Yamada et al. | 710/300 |
| 6,944,695 B1 | * | 9/2005 | Tangen | 710/107 |
| 7,162,556 B2 | * | 1/2007 | Fujiki | 710/110 |
| 7,206,878 B2 | * | 4/2007 | Smith et al. | 710/105 |
| 7,391,788 B2 | * | 6/2008 | Zhang et al. | 370/438 |
| 7,401,222 B2 | * | 7/2008 | Rodriguez et al. | 713/168 |
| 2002/0091887 A1 | * | 7/2002 | Reay et al. | 710/300 |
| 2008/0270654 A1 | * | 10/2008 | Reberga | 710/110 |

FOREIGN PATENT DOCUMENTS

| | | |
|---|---|---|
| JP | 08-084154 | 3/1996 |
| JP | 2000-165420 | 6/2000 |
| JP | 2003-141062 | 5/2003 |
| JP | 2003-242048 | 8/2003 |

* cited by examiner

*Primary Examiner*—Mark Rinehart
*Assistant Examiner*—Christopher A Daley
(74) *Attorney, Agent, or Firm*—Staas & Halsey LLP

(57) ABSTRACT

An apparatus to recognize memory devices, the apparatus including a plurality of slaves having the same fixed address, a master controller to supply power to the slaves and to output a signal to select a predetermined slave, and a power control unit to control power supplied to the slaves in response to the selection signal. The apparatus is capable of decreasing production cost by using a plurality of slaves which have the same fixed address, reducing the complexity in the manufacturing process, and providing an easier management of replaceable parts in the apparatus using the replaceable parts which include memory devices. In addition, the same fixed address can be used without changing an existing I2C interface bus, which is a standard interface.

24 Claims, 8 Drawing Sheets

APPARATUS TO RECOGNIZE MEMORY DEVICES

CROSS-REFERENCE TO RELATED APPLICATION

This application claims the benefit of Korean Patent Application No. 2006-3494, filed on Jan. 12, 2006, in the Korean Intellectual Property Office, the disclosure of which is incorporated herein in its entirety by reference.

BACKGROUND OF THE INVENTION

1. Field of the Invention

Aspects of the present invention relate to a memory apparatus including a plurality of electrically erasable programmable read-only memories which have the same fixed address, and more particularly, to an apparatus and a method to recognize memory devices in which a signal is output to select a predetermined slave among a plurality of slaves having the same fixed address and a power supply is controlled to supply power only to the selected slave, so that the selected slave can be recognized.

2. Description of the Related Art

When replaceable parts, such as toners and developers, of image forming apparatuses or other apparatuses, including printers, multi-functional peripherals, and copying machines, are used, customer replaceable unit memories (CRUM) are used to manage information on the replaceable parts, including basic information of a product and usage history. Here, the CRUM includes a plurality of electrically erasable programmable read-only memories (EEPROM) having the same fixed address. The CRUMs are identified and recognized independently.

FIG. 1A is a circuit diagram of a conventional apparatus to recognize memory devices.

The conventional apparatus includes a master controller 100, which controls an I2C interface to identify and recognize the plurality of EEPROMs included in the plurality of CRUMs, and a plurality of slaves, which are EEPROMs controlled by the master controller 100. Here, the master controller 100 is connected to a first slave 110 and a second slave 120 in parallel by the I2C bus, which includes VCC, SCL, SDA, and GND terminals.

The I2C bus includes VCC and GND lines which deliver power to the first and the second slaves 110 and 120, an SCL line which delivers a clock signal to synchronize the first and the second slaves 110 and 120 with the master controller 100, and an SDA line which is a data line of the I2C interface as illustrated in FIG. 1C. Here, the master controller 110, at first, transmits a start bit to communicate with the first and the second slaves 110 and 120. Then, the master controller 110 transmits a fixed address corresponding to a slave among a plurality of the slaves with which the master controller 110 wants to communicate. For example, for the first slave 110, the address is '000', and for the second slave 120, the address is '001'. Next, the master controller 110 transmits an R/W bit to read/write and then transmits or receives main commands or data to communicate.

In the conventional apparatus, since the first and the second slaves 110 and 120 are implemented in mass-produced replaceable parts, it is difficult and costly for the first and the second slaves 110 and 120 connected to the master controller 100 to have different fixed addresses, as illustrated in FIG. 1A. Therefore, there is a problem of high production cost. If the first and the second slaves 110 and 120 connected to the master controller 100 are configured to have the same fixed address in order to solve this problem, as illustrated in FIG. 1B, there is a problem in that it is impossible to recognize a specific slave and communicate through the existing standard I2C bus.

SUMMARY OF THE INVENTION

Aspects of the present invention provide an apparatus to recognize memory devices in which a signal is output to select a predetermined slave among a plurality of slaves having the same fixed address and a power supply is controlled to supply power only to the selected slave, so that the selected slave is recognized.

According to an aspect of the present invention, there is provided an apparatus to recognize memory devices including: a plurality of slaves having the same fixed address; a master controller which supplies power to the slaves and outputs a signal for selecting a predetermined slave; and a power control unit to control power supplied to the slaves in response to the selection signal.

The power control unit may, although not necessarily, control power, so that the power is supplied only to a slave selected by the signal.

The power control unit may, although not necessarily, include: a switch installed in a line which connects the master controller to the slaves to deliver the supplied power; and a switch control unit controlling the switches in response to the selection signal.

The switch control unit may, although not necessarily, control the switches, so that only the switch connected to the selected slave is connected according to the selection signal.

The switch control unit may, although not necessarily, transmit the selection signal to each of the switches using a logic circuit or a decoder.

According to another aspect of the present invention, there is provided an apparatus to recognize memory devices including: a master controller outputting a signal to select a predetermined slave; a plurality of slaves which have the same fixed address and receive the selection signal as a power source; and a connection unit connecting the master controller to each of the slaves.

The connection unit may, although not necessarily, deliver the selection signal using a logic circuit or a decoder which is configured to identify the slaves.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
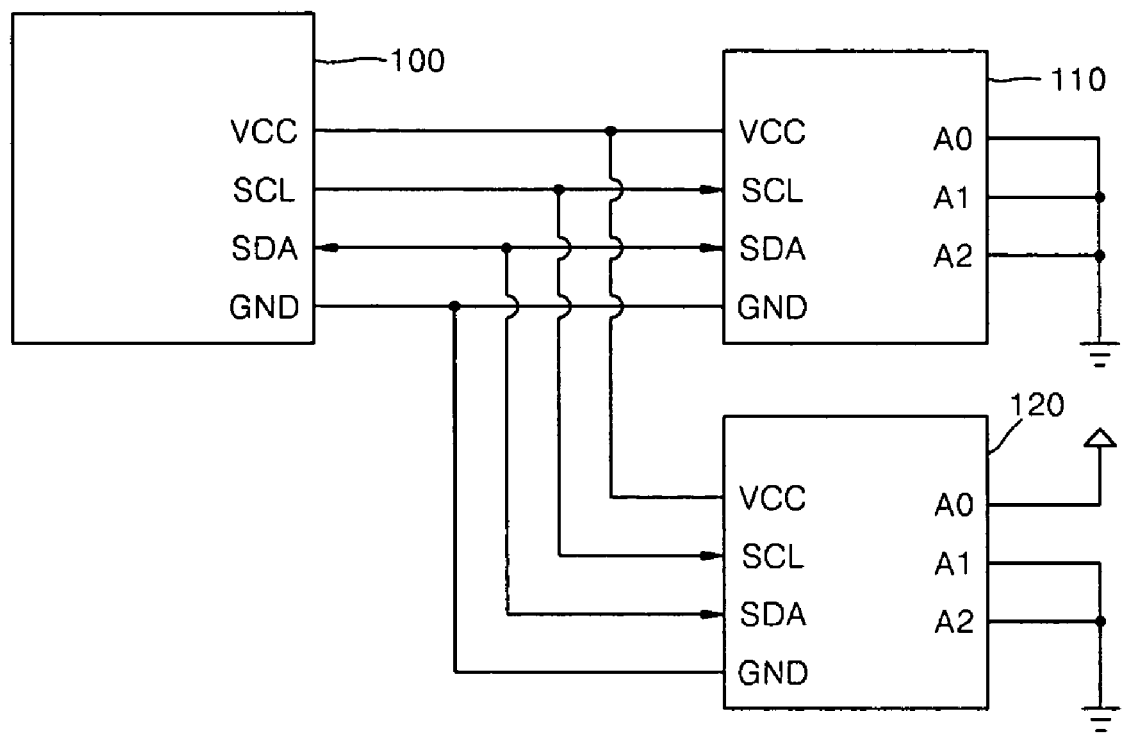
FIG. 1A is a circuit diagram of a conventional apparatus to recognize memory devices.
Figure 1B:
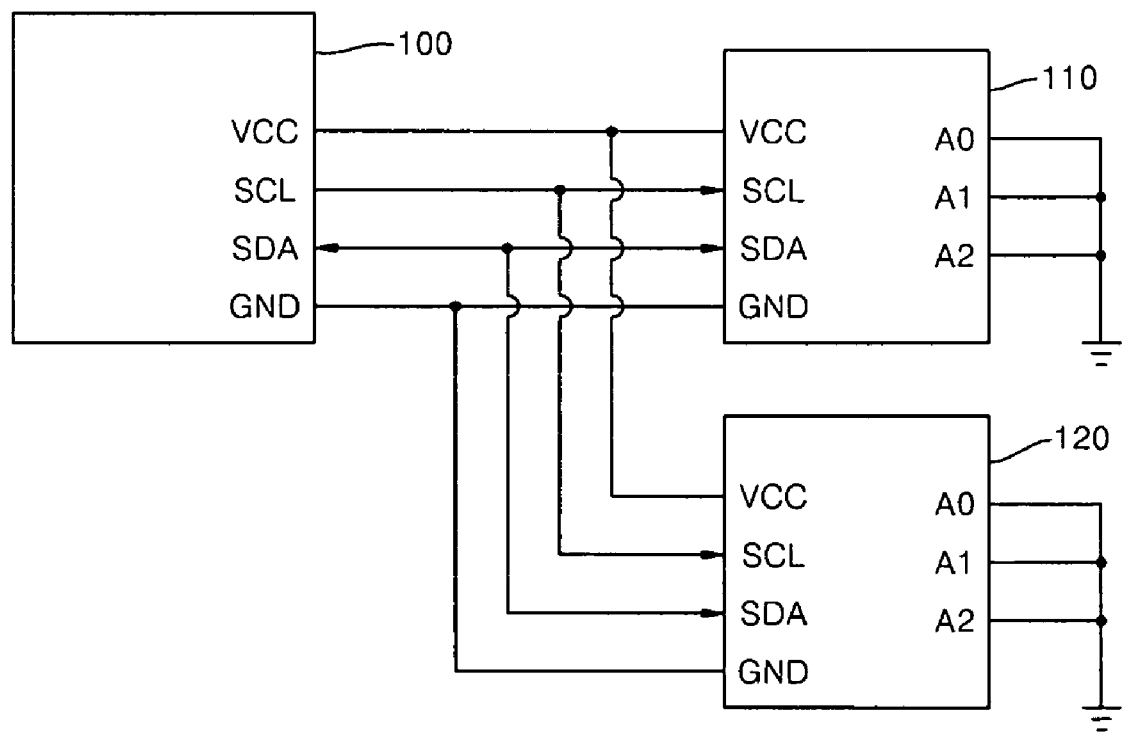
FIG. 1B is a circuit diagram of an apparatus to recognize memory devices in which slaves have the same fixed addresses.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
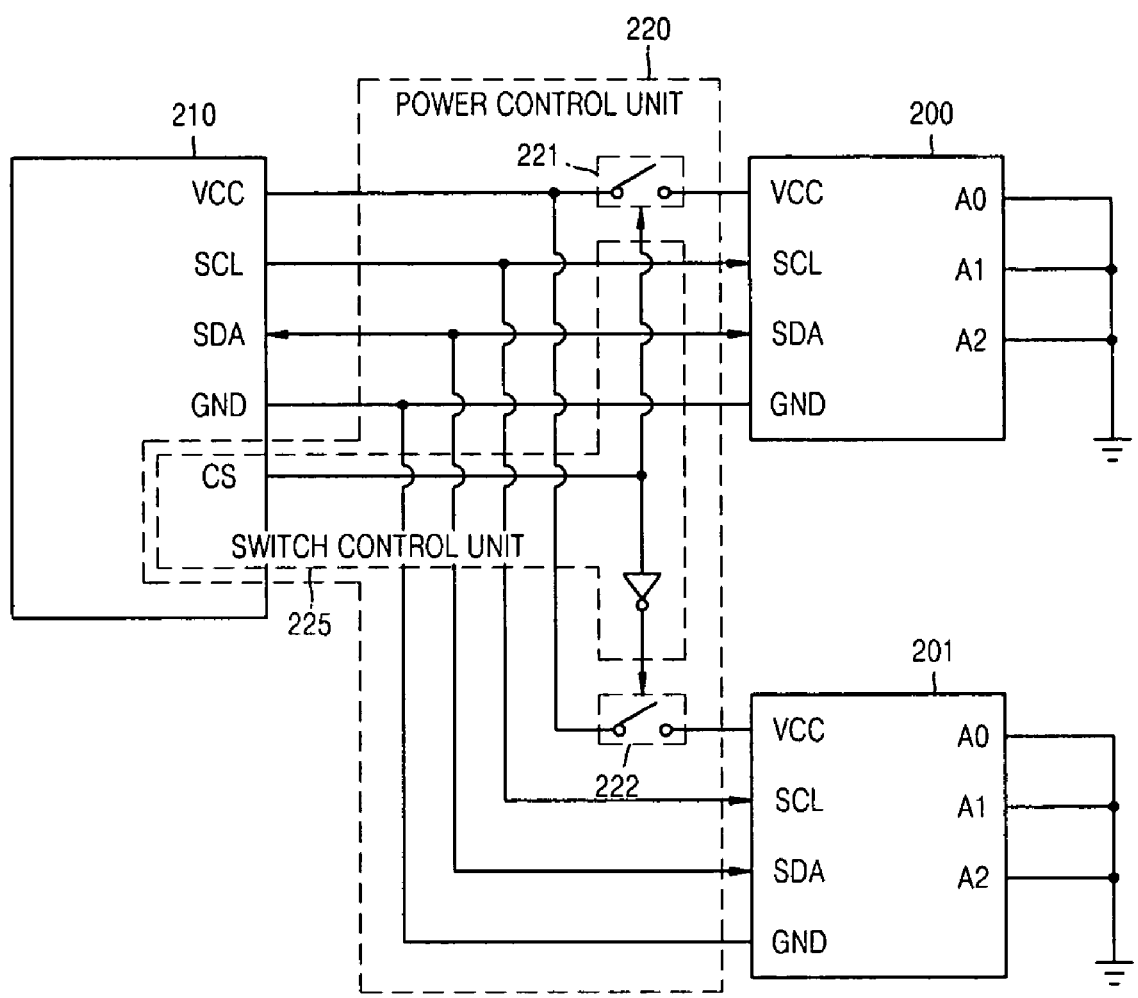
FIG. 2 is a circuit diagram of an apparatus to recognize memory devices according to an embodiment of the present invention.

FIG. 2 is a circuit diagram of an apparatus to recognize memory devices according to an embodiment of the present invention. The apparatus includes a first slave 200, a second slave 201, a master controller 210, and a power control unit 220.

An I2C bus used for the apparatus according to aspects of the present invention includes VCC, SCL, SDA, and GND signal lines, although not limited thereto. Here, the VCC line supplies power required to drive the first and the second slaves 200 and 201, which are electrically erasable programmable read-only memories (EEPROM). The SCL line is used to deliver a clock signal to synchronize the first and the second slaves 200 and 201 with the master controller 210. The SDA line is a data line of the I2C interface illustrated in FIG. 1C. The GND line is used as a ground line.

The first and the second slaves 200 and 201, which are EEPROMs, are controlled by the master controller 210. The first and the second slaves 200 and 201 include VCC, SCL, SDA, and GND input terminals. Here, the first and the second slaves 200 and 201 are EEPROMs having the same fixed address corresponding to '000' through A0, A1, and A2 terminals.

The master controller 210, which controls the I2C interface, includes VCC, SCL, SDA, GND, and CS output terminals. Here, the master controller 210 supplies power to the first and the second slaves 200 and 201 through the VCC output terminal and outputs a conversion start (CS) signal to select a specific slave between the first and the second slaves 200 and 201 connected to the master controller 210.

The power control unit 220 controls the power supplied from the master controller 210 to the first and the second slaves 200 and 201 through the VCC signal line in response to the CS signal that is output from the master controller 210. The power control unit 220 includes a first switch 221, a second switch 222, and a switch control unit 225.

The first switch 221 is installed in the VCC signal line through which the VCC signal is transmitted from the VCC output terminal of the master controller 210 to the VCC input terminal of the first slave 200. The first switch 221 turns on or off to connect or disconnect the VCC output terminal of the master controller 210 and the VCC input terminal of the first slave 200.

The second switch 222 is installed in the VCC signal line through which the VCC signal is transmitted from the VCC output terminal of the master controller 210 to the VCC input terminal of the second slave 201. The second switch 222 turns on or off to connect or disconnect the VCC output terminal of the master controller 210 and the VCC input terminal of the second slave 201.

The switch control unit 225 controls the first and the second switches 221 and 222 in response to the CS signal. Here, the switch control unit 225 controls the first and the second switches 221 and 222 so that only one switch of the first and the second switches 221 and 222 connected to a selected slave of the first and the second slaves 200 and 201 turns on according to the CS signal. However, it is understood that the switch connected to the selected slave may turn off according to another aspect of the present invention.

The switch control unit 225 transmits the CS signal to the first switch 221 directly, and transmits the CS signal to the second switch 222 through an inverter. Thus, the switch control unit 225 controls the first and the second switches 221 and 222 so that only the selected slave according to the CS signal is connected. Accordingly, the master controller 210 can identify the selected slave and communicate with the selected slave. For example, when the master controller 210 outputs the CS signal corresponding to a low level, the signal of the low level is transmitted to the first switch 221, and a signal of a high level is transmitted to the second switch 222 through the inverter, so that the second switch 222 turns on while the first switch 221 turns off. Accordingly, the master controller 210 only recognizes the second slave 201 and communicates with the second slave 201.

Figure 3:
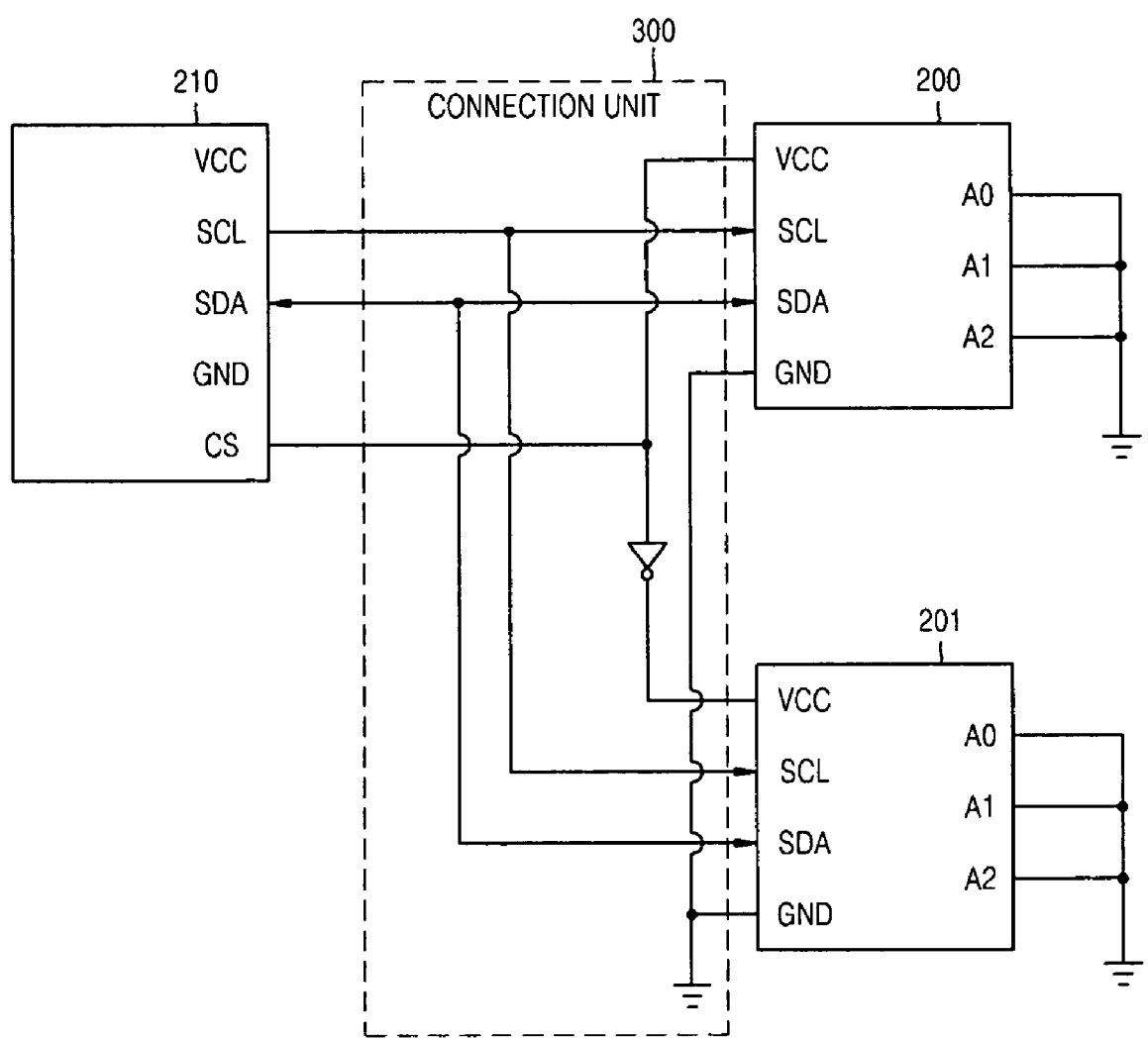
FIG. 3 is a circuit diagram of an apparatus to recognize memory devices according to another embodiment of the present invention.

FIG. 3 is a circuit diagram of an apparatus to recognize memory devices according to an embodiment of the present invention. The apparatus to recognize memory devices includes the first slave 200, the second slave 201, the master controller 210, and a connection unit 300.

Figure 1C:
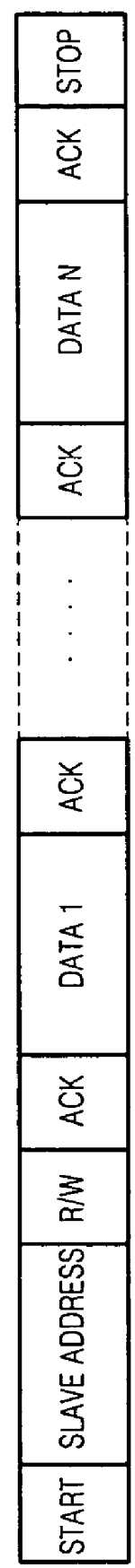
FIG. 1C is a diagram illustrating a structure of data of an I2C interface.

An I2C bus used for the apparatus to recognize memory devices includes VCC, SCL, SDA, and GND signal lines. Here, the SCL line delivers a clock signal to synchronize the master controller 210 and the first and the second slaves 200 and 201, which are EEPROMs. The SDA line is a data line of the I2C interface as illustrated in FIG. 1C. The GND line is a ground line.

The first and the second slaves 200 and 201, which are EEPROMs, are controlled by the master controller 210. The first and the second slaves 200 and 201 receive a CS signal from the master controller 210 as a power source required for the operations. The first and the second slaves 200 and 201 include VCC, SCL, SDA, and GND input terminals, although not limited thereto. Here, the first and the second slaves 200 and 201 are EEPROMs having the same fixed address corresponding to '000' through A0, A1, and A2.

The master controller 210, which controls the I2C interface, includes VCC, SCL, SDA, GND, and CS output terminals, although not necessarily and not limited thereto. Here, the master controller 210 outputs the CS signal to select a predetermined slave of the first and the second slaves 200 and 201 connected to the master controller 210.

As illustrated in FIG. 3, the connection unit 300 connects the CS output terminal of the master controller 210 to the VCC input terminals of the first and the second slaves 200 and 201, rather than connect the VCC output terminal of the master controller 210 to the VCC input terminals of the first and the second slaves 200 and 201. Accordingly, the first and the second slaves 200 and 201 use the CS signal output from the master controller 210 as a power source for operations.

Here, the connection unit 300 connects the CS output terminal of the master controller 210 to the VCC input terminal of the first slave 200 directly, and to the VCC input terminal of the second slave 201 through an inverter. Accordingly, the master controller 210 can identify a slave selected by the master controller 210 and communicate with the selected slave. For example, when the master controller 210 outputs the CS signal corresponding to a high level, a signal of the high level is transmitted to the first slave 200, and a signal of a low level is transmitted to the second slave 201 through the inverter, so that power is supplied to the first slave 200 while the power is not supplied to the second slave. Accordingly, the master controller 210 can only recognize the first slave 200 and communicate with the first slave 200.

If the embodiment of the present invention illustrated in FIG. 3 is compared with the embodiment illustrated in the FIG. 2, according to the embodiment illustrated in FIG. 3, the first and the second switches 221 and 222 are removed to decrease the number of components and simplify connections of the components, so that a production cost and a possibility of malfunction decrease. Accordingly, reliability of communication in the I21C is improved. In addition, although long signal lines are required between the first and the second slaves 200 and 201 located far from the master controller 210, since the number of signal lines can be reduced, the production cost decreases, and the reliability of the communication is improved.

Figure 4:
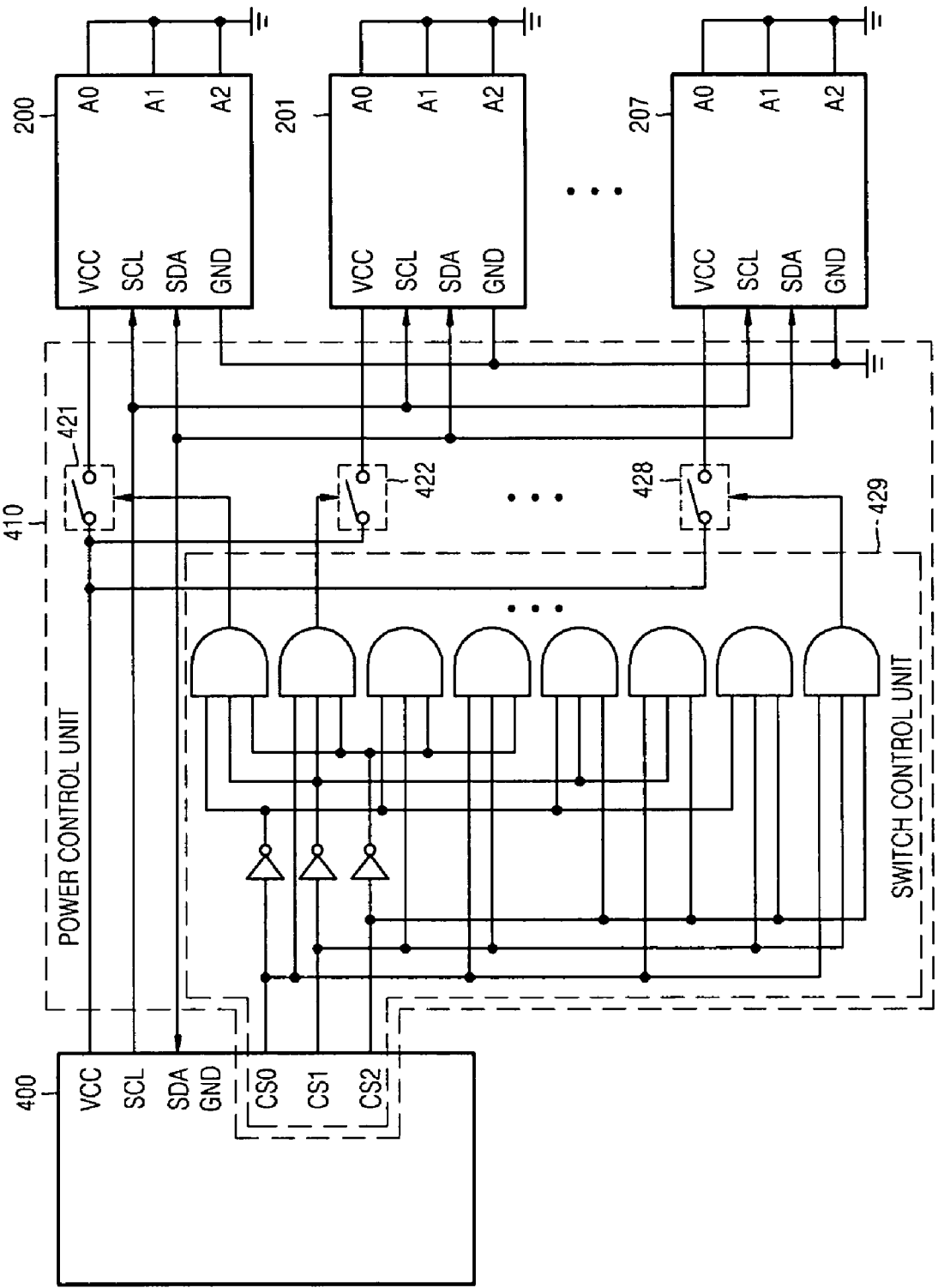
FIG. 4 is a circuit diagram of an apparatus to recognize memory devices according to another embodiment of the present invention.

FIG. 4 is a circuit diagram of an apparatus to recognize memory devices according to another embodiment of the present invention. The apparatus to recognize memory devices includes first to eighth slaves 200 to 207, a master controller 400, and a power controller 410.

The first to eighth slaves 200 to 207, which are EEPROMs, are controlled by the master controller 400. Each slave of the first to eighth slaves 200 to 207 includes VCC, SCL, SDA, and GND input terminals. Here, the first to eighth slaves 200 to 207 are EEPROMs having the same fixed address corresponding to '000' through A0, A1, and A2.

The master controller 400 controls the I2C interface. The master controller 400 includes VCC, SCL, SDA, GND, CS0, CS1, and CS2 output terminals. Here, the master controller 400 outputs CS0, CS1, and CS2 signals to select a predetermined slave of the first to eighth slaves 200 to 207 connected to the master controller 400.

The power control unit 410 controls power supplied from the master controller 400 to the first to eighth slaves 200 to 207 through a VCC signal line in response to the CS0, CS1, and CS2 signals output from the master controller 400. Here, the power control unit 420 includes first to eighth switches 421 to 428 and a switch control unit 429.

The first to eighth switches 421 to 428 are provided in the VCC signal line through which a VCC signal is transmitted from the VCC output terminal of the master controller 400 to the VCC input terminals of the first to eighth switches 421 to 428. The first to eighth switches 421 to 428 turn on or off to connect or disconnect the VCC output terminal of the master controller 400 and the VCC input terminals of the first to eighth switches 421 to 428.

The switch control unit 429 controls the first to eighth switches 421 to 428 so that each switch of the first to eighth switches 421 to 428 turns on or off in response to the CS0, CS1, and CS2 signals. Here, the switch control unit 429 controls the first to eighth switches 421 to 428, so that a switch connected to a selected slave according to the CS0, CS1, CS2 signals turns off. However, it is understood that the switch connected to the selected slave may turn on, such as in the embodiment illustrated in FIG. 2, according to another aspect of the present invention.

The switch control unit 429 controls the first to eighth switches 421 to 428 by passing the CS0, CS1, and CS2 signals through a logic circuit including a plurality of AND gates and inverters as illustrated in FIG. 4, so that only a selected slave is connected. Accordingly, the master controller 400 can identify the selected slave and communicate with the selected slave. For example, when the CS0, CS1, and CS2 signals are output as the low, high, and high levels, respectively, from the master controller 400, only the fourth switch 424 turns off while the first to third switches 421 to 423, and the fifth to eighth switches 425 to 428 turn on. Accordingly, the master controller 210 recognizes only the fourth slave 203, and thus communicates with the fourth slave 203.

More or less than eight slaves 200 to 207 may be connected to the master controller 400. $2^N$ slaves may be connected to the master controller 400 by providing and controlling $2^N$ switches using N number of CS signals, such as CS1, CS2 to CSN signals, and a logic circuit including a plurality of AND gates and inverters in the power control unit 410.

Figure 5:
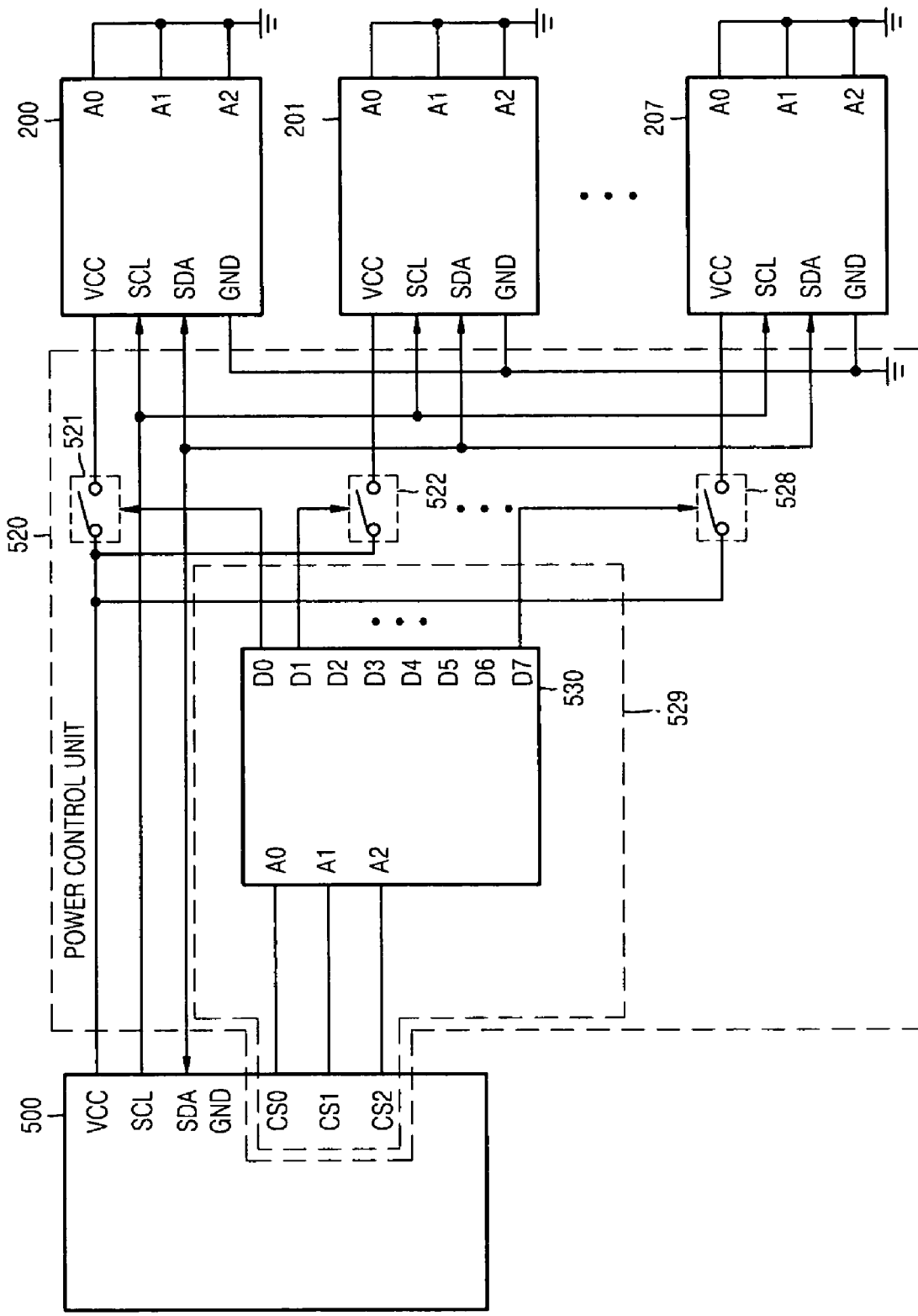
FIG. 5 is a circuit diagram of an apparatus to recognize memory devices according to another embodiment of the present invention.

FIG. 5 is a circuit diagram of an apparatus to recognize memory devices according to another embodiment of the present invention. The apparatus to recognize memory devices illustrated in FIG. 5 includes first to eighth slaves 200 to 207, a master controller 500, and a power control unit 520.

The first to eighth slaves 200 to 207, which are EEPROMs, are controlled by the master controller 500. The first to eighth slaves 200 to 207 include VCC, SCL, SDA, and GND input terminals. Here, the first to eighth slaves 200 to 207 are EEPROMs having the same fixed address corresponding to '000' through A0, A1, and A2.

The master controller 500 controls an I2C interface. The master controller 500 includes VCC, SCL, SDA, GND, CS0, CS1, and CS2 output terminals. Here, the master controller 500 outputs CS0, CS1, and CS2 signals to select a predetermined slave of the first to eighth slaves 200 to 207 connected to the master controller 500.

The power control unit 520 controls power supplied to the first to eighth slaves 200 to 207 from the master controller 500 through a VCC signal line in response to the CS0, CS1, and CS2 signals output from the master controller 500. Here, the power control unit 520 includes first to eighth switches 521 to 528 and a switch control unit 529.

The first to eighth switches 521 to 528 are provided in the VCC signal line through which a VCC signal is transmitted from the VCC output terminal of the master controller 500 to the VCC input terminals of the first to eighth slaves 200 to 207 to turn on or off the first to eighth switches and connect or disconnect the VCC output and input terminals.

The switch control unit 529 controls the first to eighth switches 521 to 528 in response to the CS0, CS1, and CS2 signals. Here the switch control unit controls the first to eighth switches 521 to 528, so that a switch connected to a selected slave of the first to eighth slaves 200 to 207 according to CS0, CS1, and CS2 signals turns off. However, it is understood that the switch connected to the selected slave may turn on, such as in the embodiment illustrated in FIG. 2, according to another aspect of the present invention.

The switch control unit 529 controls the first to eighth switches 521 to 528, so that only the selected slave is connected by passing the CS0, CS1, and CS2 signals through a logic circuit including a 3-to-8 decoder 530. Accordingly, the master controller 500 can identify only the selected slave and communicate with the selected slave. For example, when the CS0, CS1, and CS2 signals are output as the high, high, and low levels, respectively, only the fifth switch 525 turns off while the first to fourth switches 521 to 524 and the sixth to eighth switches 526 to 528 turn on. Accordingly, the master controller 210 recognizes the fifth slave 504 only and communicates with the fifth slave 504.

More or less than eight slaves 200 to 207 may be connected to the master controller 500. $2^N$ slaves may be connected to the master controller 500 by providing and controlling $2^N$ switches using N number of CS signals, such as CS1, CS2 to CSN signals, and an N-to-$2^N$ decoder in the power control unit 520.

Figure 6:
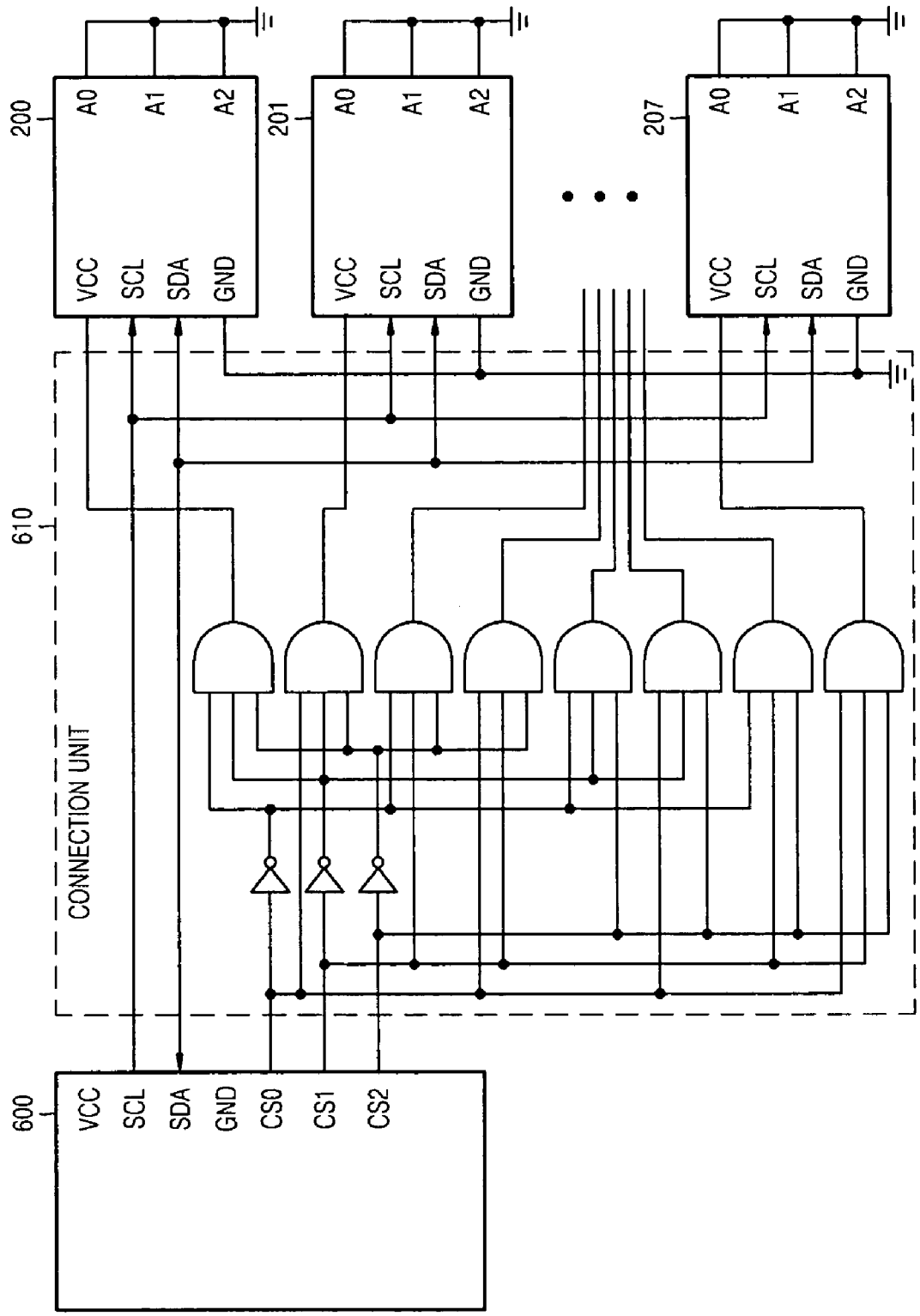
FIG. 6 is a circuit diagram of an apparatus to recognize memory devices according to another embodiment of the present invention.

FIG. 6 is a circuit diagram of an apparatus to recognize memory devices according to another embodiment of the present invention. The apparatus to recognize memory devices illustrated in FIG. 6 includes first to eighth slaves 200 to 207, a master controller 600, and a connection unit 610.

The first to eighth slaves 200 to 207, which are EEPROMs, are controlled by the master controller 600 and receive CS0, CS1, and CS2 signals from the master controller 600 as a power source required for operations. The first to eighth slaves 200 to 207 includes VCC, SCL, SDA, and GND input terminals. Here, the first to eighth slaves 200 to 207 are EEPROMs having the same fixed address corresponding to '000' through A0, A1, and A2.

The master controller 600 controls an I2C interface. The master controller 600 includes VCC, SCL, SDA, GND, CS0, CS1, and CS2 output terminals. Here, the master controller 600 outputs CS0, CS1, and CS2 output signals to select a predetermined slave of the first to eighth slaves 200 to 207 connected to the master controller 600.

The connection unit 610 connects CS0, CS1, and CS2 output terminals of the master controller 600 to each of the VCC input terminals of the first to eighth slaves 200 to 207, rather than connect the VCC output terminal of the master controller 600 to the VCC input terminals of the first to eighth slaves 200 to 207, as illustrated in FIG. 2. Accordingly, the first to eighth slaves 200 to 207 use the CS0, CS1, and CS2 signals output from the master controller 600 as a power source for operations.

Here, the connection unit 610 connects the master controller 600 to the first to eighth slaves 200 to 207 through a logic circuit including a plurality of AND gates and inverters as illustrated in FIG. 6. Accordingly, the master controller 600 recognizes only the slave selected by the master controller 600 and communicates only with the selected slave. For example, when the CS0, CS1, and CS2 signals are output as the low, high, and low levels, respectively, from the master controller 600, a signal of the high level is transmitted to the third slave 202 due to AND gates and inverters included in the connection unit 610 while signals of the low level are transmitted to the first, second, and the fourth to eighth slaves 200, 201, and 203 to 207. As a result, the power is supplied only to the third slave 202 but not to the first, second, and fourth to eighth slaves 200, 201, and 203 to 207. Therefore, the master controller 600 recognizes only the third slave 202 and communicates with the third slave 202.

Accordingly, when the CS0, CS1, and CS2 signals correspond to the low, low, and low levels, respectively, the mater controller 600 recognizes and communicates only with the first slave 200. When the CS0, CS1, and CS2 signals correspond to the low, low, and high levels, respectively, the mater controller 600 recognizes and communicates only with the second slave 201. When the CS0, CS1, and CS2 signals correspond to the low, high, and low levels, respectively, the mater controller 600 recognizes and communicates only with the third slave 202. When the CS0, CS1, and CS2 signals correspond to the low, high, and high levels, respectively, the mater controller 600 recognizes and communicates only with the fourth slave 203. When the CS0, CS1, and CS2 signals correspond to the high, high, and low levels, respectively, the mater controller 600 recognizes and communicates only with the fifth slave 204. When the CS0, CS1, and CS2 signals correspond to the high, low, and high levels, respectively, the mater controller 600 recognizes and communicates only with the sixth slave 205. When the CS0, CS1, and CS2 signals correspond to the high, high, and low levels, respectively, the mater controller 600 recognizes and communicates only with the seventh slave 206. When the CS0, CS1, and CS2 signals correspond to the high, high, and high levels, respectively, the mater controller 600 recognizes and communicates only with the eighth slave 207. However, it is understood that, according to an aspect of the invention, inverse levels of the signals, as related to the levels used above, may be used to achieve the same results by, for example, including additional inverters. That is, for example, when the CS0, CS1, and CS2 signals correspond to the high, high, and high levels, respectively, the master controller 600 may only recognize and communicate with the first slave 200.

More or less than eight slaves 200 to 207 may be connected to the master controller 600. $2^N$ slaves may be connected to the master controller 600 by providing N number of CS signals, such as CS1, CS2 to CSN, and a logic circuit including a plurality of AND gates and inverters in the connection unit 610.

Figure 7:
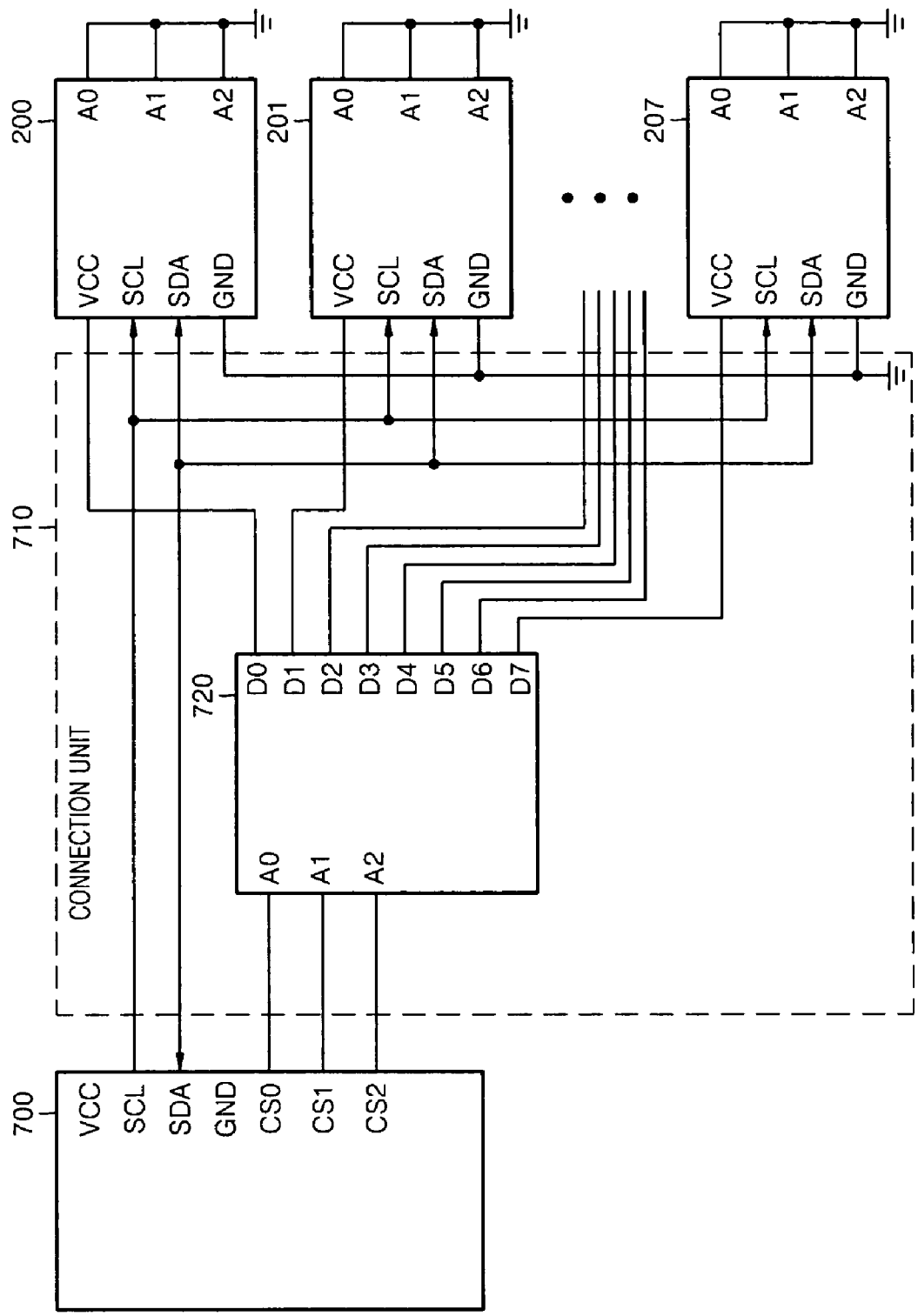
FIG. 7 is a circuit diagram of an apparatus to recognize memory devices according to another embodiment of the present invention.

FIG. 7 is a circuit diagram of an apparatus to recognize memory devices according to another embodiment of the present invention. The apparatus to recognize memory devices illustrated in FIG. 7 includes first to eighth slaves 200 to 207, a master controller 700, and a connection unit 710.

The first to eighth slaves 200 to 207, which are EEPROMs, are controlled by the master controller 700 and receive CS0, CS1, and CS2 signals as power sources for operations from the master controller 700. The first to eighth slaves 200 to 207 include VCC, SCL, SDA, and GND input terminals. Here, the first to eighth slaves 200 to 207 are EEPROMs having the same fixed address corresponding to '000' through A0, A1, and A2.

The master controller 700 controls an I2C interface. The master controller 700 includes VCC, SCL, SDA, GND, CS0, CS1, and CS2 output terminals, although not necessarily and not limited thereto. Here, the master controller 700 outputs the CS0, CS1, and CS2 signals to select a predetermined slave of the first to eighth slaves 200 to 207 connected to the master controller 700.

The connection unit 710 connects CS0, CS1, and CS2 output terminals of the master controller 700 to each of the VCC input terminals of the first to eighth slaves 200 to 207, rather than connect the VCC output terminal of the master controller 700 to the VCC input terminals of the slaves as illustrated in FIG. 2. Accordingly, the first to eighth slaves 200 to 207 use the CS0, CS1, and CS2 signals output from the mater controller 700 as power sources for operations.

As illustrated in FIG. 7, the connection unit 710 includes a 3-to-8 decoder 720 and connects the master controller 700 to the first to eighth slaves 200 to 207. Accordingly, the master controller 700 recognizes and communicates only with the slave selected by the master controller 700. For example, when the master controller 700 outputs the CS0 signal of a low level, the CS1 signal of a high level, and the CS2 signal of the low level, a signal of the high level is transmitted to the third slave 202 by a decoder 720 included in the connection unit 710 and signals of the low level are transmitted to the first, second, and fourth to eighth slaves 200, 201, and 203 to 207, so that power is supplied to the third slave 202 only, and not to the first, second, and the fourth to eighth slaves 200, 201, and 203 to 207. As a result, the master controller 700 only recognizes and communicates with the third slave 202.

Accordingly, when the CS0, CS1, and CS2 signals correspond to the low, low, and low levels, respectively, the mater controller 700 recognizes and communicates only with the first slave 200. When the CS0, CS1, and CS2 signals correspond to the low, low, and high levels, respectively, the mater controller 700 recognizes and communicates only with the second slave 201. When the CS0, CS1, and CS2 signals correspond to the low, high, and low levels, respectively, the mater controller 700 recognizes and communicates only with the third slave 202. When the CS0, CS1, and CS2 signals correspond to the low, high, and high levels, respectively, the mater controller 700 recognizes and communicates only with the fourth slave 203. When the CS0, CS1, and CS2 signals correspond to the high, low, and low levels, respectively, the mater controller 700 recognizes and communicates only with the fifth slave 204. When the CS0, CS1, and CS2 signals correspond to the high, low, and high levels, respectively, the mater controller 700 recognizes and communicates only with the sixth slave 205. When the CS0, CS1, and CS2 signals correspond to the high, high, and low levels, respectively, the mater controller 700 recognizes and communicates only with the seventh slave 206. When the CS0, CS1, and CS2 signals correspond to the high, high, and high levels, respectively, the mater controller 700 recognizes and communicates only with the eighth slave 207. However, it is understood that, according to an aspect of the invention, inverse levels of the signals, as related to the levels used above, may be used to achieve the same results by, for example, including additional inverters. That is, for example, when the CS0, CS1, and CS2 signals correspond to the high, high, and high levels, respectively, the master controller 600 may only recognize and communicate with the first slave 200.

More or less than eight slaves 200 to 207 may be connected to the master controller 700. $2^N$ slaves may be connected to the master controller 700 by providing N number of CS signals and an N-to-$2^N$ decoder included in the connection unit 710.

According to aspects of the present invention, an apparatus is provided wherein a signal to select a predetermined slave of a plurality of slaves having the same fixed address is output, and power supply is controlled to be supplied only to a selected slave, so that the selected slave is recognized.

Accordingly, the apparatus is capable of decreasing production cost by using a plurality of slaves which have the same fixed address, reducing the complexity in the manufacturing process, and providing an easier management of replaceable parts in the apparatus using the replaceable parts which include memory devices. In addition, in the apparatus, the same fixed address can be used without changing an existing I2C interface bus, which is a standard interface.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to recognize memory devices, the apparatus comprising: a plurality of slaves having a same fixed address;
    a master controller to output one or more selection signals to select a predetermined slave of the plurality of slaves to communicate with and to supply power to the plurality of slaves; and a connection unit to control a selection of the predetermined slave based on the one or more selection signals;
    the apparatus as, wherein the connection unit comprises: a power control unit to control the power supplied to the plurality of slaves in response to the one or more selection signals so that the power is supplied to only the predetermined slave and the power is supplied in a power transmission signal that is distinct from the one or more selection signals.

2. The apparatus as claimed in claim 1, wherein the power control unit comprises:
    a plurality of switches provided on a plurality of power transmission lines, which connects the master controller to the plurality of slaves to transmit the power transmission signal; and
    a switch control unit to control the plurality of switches in response to the one or more selection signals so that only one power transmission line, of the plurality of power transmission lines, connected to the predetermined slave transmits the power transmission signal.

3. The apparatus as claimed in claim 2, wherein the switch control unit controls the plurality of switches so that one switch, of the plurality of switches, corresponding to the predetermined slave and provided on the one power transmission line is in an on position, according to the one or more selection signals, to allow the master controller to communicate with the predetermined slave and to allow the master controller to deliver the supplied power to the predetermined slave.

4. The apparatus as claimed in claim 3, wherein the switch control unit comprises one or more inverters and/or one or more AND gates to control a level of the one or more selection signals so that the one switch is in the on position when receiving the one or more selection signals having a first level.

5. The apparatus as claimed in claim 4, wherein the one or more selection signals comprises N number of selection signals, the plurality of slaves comprises $2^N$ slaves, and the plurality of switches comprises $2^N$ switches.

6. The apparatus as claimed in claim 4, wherein
    the plurality of slaves comprises a first slave and a second slave;
    the plurality of switches comprises a first switch, corresponding to the first slave, and a second switch, corresponding to the second slave;
    the master controller outputs one selection signal having the first level or a second level to select the predetermined slave to communicate with; and
    the one or more inverters comprises one inverter provided on a selection signal transmission line, which transmits the one selection signal from the master controller to the second switch, to convert the first level or the second level of the one selection signal output from the master controller,
    wherein, when the master controller outputs the one selection signal having the first level, the first switch receives the one selection signal having the first level and the second switch receives the one selection signal having the second level; and when the master controller outputs the one selection signal having the second level, the first switch receives the one selection signal having the second level and the second switch receives the one selection signal having the first level.

7. The apparatus as claimed in claim 3, wherein the switch control unit comprises a logic circuit and/or a decoder to control a level of the one or more selection signals so that the one switch is in the on position when receiving the one or more selection signals having a first level.

8. The apparatus as claimed in claim 7, wherein the one or more selection signals comprises N number of selection signals, the plurality of slaves comprises $2^N$ slaves, the plurality of switches comprises $2^N$ switches, and the decoder is an N-to-$2^N$ decoder.

9. The apparatus as claimed in claim 1, wherein the power is supplied to only the predetermined slave and the power is supplied in the one or more selection signals.

10. The apparatus as claimed in claim 9, wherein the connection unit comprises one or more inverters and/or one or more AND gates to control a level of the one or more selection signals so that the one or more selection signals having a first level supplies the power to a corresponding slave to allow the master controller to communicate with the corresponding slave; and the one or more selection signals having a second level does not supply the power to the corresponding slave to prevent the master controller from communicating with the corresponding slave.

11. The apparatus as claimed in claim 10, wherein the one or more selection signals comprises N number of selection signals and the plurality of slaves comprises $2^N$ slaves.

12. The apparatus as claimed in claim 10, wherein
the plurality of slaves comprises a first slave and a second slave;
the master controller outputs one selection signal having the first level or the second level to select the predetermined slave to communicate with; and
the one or more inverters comprises one inverter provided on a selection signal transmission line, which transmits the one selection signal from the master controller to the second slave, to convert the first level or the second level of the one selection signal output from the master controller,
wherein, when the master controller outputs the one selection signal having the first level, the first slave receives the one selection signal having the first level and the second slave receives the one selection signal having the second level; and when the master controller outputs the one selection signal having the second level, the first slave receives the one selection signal having the second level and the second slave receives the one selection signal having the first level.

13. The apparatus as claimed in claim 9, wherein the connection unit comprises a logic circuit and/or a decoder to control a level of the one or more selection signals so that the one or more selection signals having a first level supplies the power to a corresponding slave to allow the master controller to communicate with the corresponding slave; and the one or more selection signals having a second level does not supply the power to the corresponding slave to prevent the master controller from communicating with the corresponding slave.

14. The apparatus as claimed in claim 13, wherein the one or more selection signals comprises N number of selection signals, the plurality of slaves comprises $2^N$ slaves, and the decoder is an N-to-$2^N$ decoder.

15. A method to recognize a predetermined slave of a plurality of slaves having a same fixed address, the method comprising:
outputting one or more selection signals to select the predetermined slave to communicate with; and supplying power to the predetermined slave based on the one or more selection signals;
wherein the supplying of the power comprises transmitting the power in a power transmission signal, which is distinct from the one or more selection signals, through a plurality of power transmission lines inputted to the plurality of slaves.

16. The method as claimed in claim 15, wherein the supplying of the power further comprises:
controlling a level of the one or more selection signals;
connecting a first power transmission line, of the plurality of the power transmission lines, when a first switch thereon receives the one or more selection signals having a first level; and
disconnecting the first power transmission line, of the plurality of power transmission lines, when the first switch receives the one or more selection signals having a second level.

17. The method as claimed in claim 16, wherein the controlling a level of the one or more selection signals comprises:
converting the level of the one or more selection signals using a plurality of inverters and/or a plurality of AND gates, so that a switch on one power transmission line, of the plurality of the power transmission lines, inputted to the predetermined slave receives the one or more selection signals having the first level, and an other switch on an other power transmission line, of the plurality of power transmission lines, inputted to an other slave receives the one or more selection signals having a second level.

18. The method as claimed in claim 16, wherein the controlling a level of the one or more selection signals comprises:
converting the level of the one or more selection signals using a logic circuit and/or a decoder, so that a switch on one power transmission line, of the plurality of the power transmission lines, inputted to the predetermined slave receives the one or more selection signals having the first level, and an other switch on an other power transmission line, of the plurality of power transmission lines, inputted to an other slave receives the one or more selection signals having a second level.

19. An apparatus to recognize memory devices, the apparatus comprising: a first slave having a fixed address; a second slave having the same fixed address as that of the first slave; a master controller which outputs a selection signal having a first level to select and supply power to the first slave, and which outputs the selection signal having a second level to select and supply power to the second slave; and
the apparatus, wherein the power is supplied in a first power transmission signal distinct from the selection signal and received by the first slave through a first power transmission line, and a second power transmission signal distinct from the selection signal and received by the second slave through a second power transmission line.

20. The apparatus as claimed in claim 19, wherein the connection unit comprises:
a first switch to receive the selection signal and to connect or disconnect the first power transmission line to or from the first slave based on the level of the received selection signal;
a second switch to receive the selection signal and to connect or disconnect the second power transmission line to or from the second slave based on the level of the received selection signal; and
an inverter to convert the level of the selection signal received by the second switch,
wherein, when the master controller outputs the selection signal having the first level, the first switch receives the selection signal having the first level, the first switch connects the first power transmission line, the second switch receives the selection signal having the second level, and the second switch disconnects the second power transmission line; and when the master controller outputs the selection signal having the second level, the first switch receives the selection signal having the second level, the first switch disconnects the first power transmission line, the second switch receives the selection signal having the first level, and the second switch connects the second power transmission line.

21. The apparatus as claimed in claim 19, wherein the connection unit comprises:
   a first switch to receive the selection signal and to connect or disconnect the first power transmission line to or from the first slave based on the level of the received selection signal;
   a second switch to receive the selection signal and to connect or disconnect the second power transmission line to or from the second slave based on the level of the received selection signal; and
   a logic circuit and/or a decoder to convert the level of the selection signal received by the second switch,
   wherein, when the master controller outputs the selection signal having the first level, the first switch receives the selection signal having the first level, the first switch connects the first power transmission line, the second switch receives the selection signal having the second level, and the second switch disconnects the second power transmission line; and when the master controller outputs the selection signal having the second level, the first switch receives the selection signal having the second level, the first switch disconnects the first power transmission line, the second switch receives the selection signal having the first level, and the second switch connects the second power transmission line.

22. The apparatus as claimed in claim 19, wherein the power is supplied in the selection signal having the first level.

23. The apparatus as claimed in claim 22, wherein the connection unit comprises an inverter to convert the level of the selection signal received by the second switch,
   wherein, when the master controller outputs the selection signal having the first level, the first slave receives the selection signal having the first level and the second slaves receives the selection signal having the second level; and when the master controller outputs the selection signal having the second level, the first slave receives the selection signal having the second level and the second slave receives the selection signal having the first level.

24. The apparatus as claimed in claim 22, wherein the connection unit comprises a logic circuit and/or a decoder to convert the level of the selection signal received by the second switch,
   wherein, when the master controller outputs the selection signal having the first level, the first slave receives the selection signal having the first level and the second slaves receives the selection signal having the second level; and when the master controller outputs the selection signal having the second level, the first slave receives the selection signal having the second level and the second slave receives the selection signal having the first level.

* * * * *